(12) United States Patent
Hashimoto (10) Patent No.: US 7,323,914 B2
(45) Date of Patent: Jan. 29, 2008

(54) CHARGE PUMP CIRCUIT

(75) Inventor: Fuminori Hashimoto, Fukaya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/216,605

(22) Filed: Aug. 31, 2005

(65) Prior Publication Data

US 2006/0044052 A1  Mar. 2, 2006

(30) Foreign Application Priority Data

Sep. 1, 2004  (JP) .............................. 2004-254231

(51) Int. Cl.
*H03L 7/06* (2006.01)
(52) U.S. Cl. ...................... 327/148; 327/157
(58) Field of Classification Search .................. None
See application file for complete search history.

(56) References Cited

U.S. PATENT DOCUMENTS

| | | | | |
|---|---|---|---|---|
| 4,802,739 A | * | 2/1989 | Iwamoto ..................... 345/87 |
| 5,574,407 A | * | 11/1996 | Sauer et al. .................. 331/14 |
| 5,699,018 A | * | 12/1997 | Yamamoto et al. .......... 330/297 |
| 5,895,328 A | * | 4/1999 | Pahio ........................... 473/224 |
| 5,982,836 A | * | 11/1999 | Sakae et al. ................. 375/376 |
| 6,021,056 A | * | 2/2000 | Forbes et al. ................. 363/60 |
| 6,140,881 A | * | 10/2000 | Kim ............................. 331/20 |
| 6,876,185 B2 | * | 4/2005 | Niratsuka ................. 324/76.53 |
| 7,009,857 B2 | * | 3/2006 | Chen et al. ................... 363/60 |
| 2003/0085742 A1 | * | 5/2003 | Jain ........................... 327/156 |
| 2003/0201805 A1 | * | 10/2003 | Holland et al. ............. 327/113 |
| 2005/0104651 A1 | * | 5/2005 | Hashimoto .................. 327/536 |

FOREIGN PATENT DOCUMENTS

JP  7-298607  11/1995

OTHER PUBLICATIONS

English Patent Abstract of JP7298607 from esp@cenet, published Nov. 10, 1995, 1 page.

* cited by examiner

Primary Examiner—Quan Tra
Assistant Examiner—Khareem E Almo
(74) Attorney, Agent, or Firm—Osha Liang L.L.P.

(57) ABSTRACT

Adverse effects of switching noise produced by a charge pump circuit on a displayed image are prevented. In a synchronizing separation circuit 18, a synchronizing signal is separated from a video signal. The separated synchronizing signal is subjected to ½ frequency division in a flip-flop 20 to obtain a clock signal having a period which is two times as much as one horizontal period, and this clock signal is utilized to control switching of the charge pump circuit. As a result, a timing at which each switch in the charge pump is changed over can be set in a period close to a horizontal synchronizing signal without a video signal, thereby preventing noise from affecting the video signal.

9 Claims, 9 Drawing Sheets

CHARGE PUMP CIRCUIT

CROSS-REFERENCE TO RELATED APPLICATION

The entire disclosure of Japanese Application No. 2004-254231 including the specification, claims, drawings, and abstract is incorporated herein by reference.

BACKGROUND OF THE INVENTION

1. Field of the Invention

The present invention relates to a charge pump circuit which utilizes a charging voltage of a charged capacitor to shift a power supply voltage, thereby producing an output voltage.

2. Conventional Art

Charge pump circuits are used in many types of conventional circuits. Particularly in various types of portable devices, power supply voltage is limited because a battery power supply is used. On the other hand, there is a conflicting demand that a higher power supply voltage be made available in order to facilitate operations of desired circuits. Thus, a charge pump circuit is often used to boost the voltage of a battery power supply. Such a charge pump circuit utilizing a capacitor is disclosed in, e.g., Japanese Patent Laid-open Publication No. Hei 7-298607. Further, a negative power supply may be required for circuit operations in some cases, a charge pump circuit is used in such cases.

Here, in such a charge pump circuit, during a changeover operation of a switch which controls charging and shifting of a capacitor, a large current change occurs in a short time, at the time of changeover of the switch in particular. Because this change is applied to a power supply or GND (ground), noise is generated.

In particular, when such noise is superposed on a video signal which is used to display an image on a display, this noise disadvantageously affects the appearance of the displayed image. When a signal which is asynchronous with the video signal is used as the above-described switching signal, although it may appear that the signal has not been damaged, because a switching clock has a fixed cycle and noise is present at a position where an image is displayed, there is a problem that an an oblique stripe pattern may appear on a monitor, depending on when the image is viewed. When a horizontal synchronizing signal or the like is used for a switching signal of the switch in the charge pump circuit at a position where a picture is displayed, noise is superposed on a specific position and a vertical line is generated in the display displayed on the display unit.

SUMMARY OF THE INVENTION

In the present invention, a synchronizing signal separated from a video signal is subjected to frequency division in a flip-flop to obtain a clock signal, and this clock signal is utilized to control switching of a charge pump circuit. As a result, the timing of a changing over of a switch of the charge pump can be set to a period close to a horizontal synchronizing signal without a video signal, enabling occurrence of noise in the video signal to be avoided.

BRIEF DESCRIPTION OF THE DRAWINGS

Preferred embodiments of the present invention will be described in further detail based on the following drawings, wherein.

DETAILED EXPLANATION OF THE PREFERRED EMBODIMENTS

Embodiments according to the present invention will now be described hereinafter with reference to the accompanying drawings.

"Charge Pump Circuit"

Figure 1:
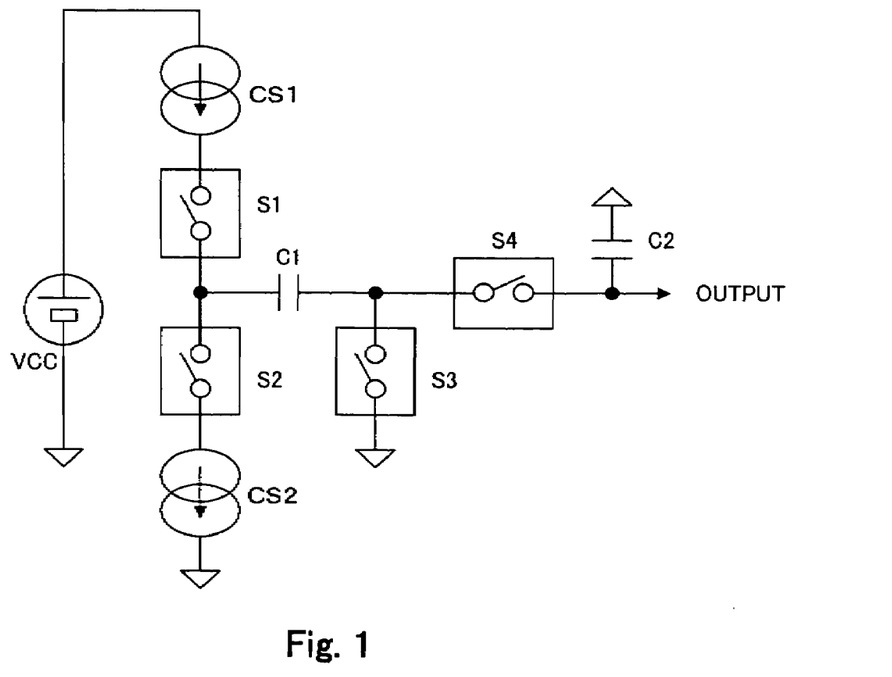
FIG. 1 is a view showing a configuration of a charge pump circuit according to an embodiment of the present invention.

FIG. 1 is a view showing a configuration of a charge pump circuit according to a first embodiment of the present invention. This charge pump circuit obtains −VCC from a power supply VCC.

One end of the power supply VCC is connected to a ground having a voltage 0V, and the other end of the same is connected to one end of a capacitor C1 through a constant current circuit CS1 and a switch S1.

One end of this capacitor C1 is also connected to the ground through a switch S2 and a constant current circuit CS2. The other end of the capacitor C1 is connected to the ground through a switch S3 and also connected to an output end through a switch S4, and one end of a capacitor C2 having the other end connected to the ground is connected to the output end.

In such a charge pump circuit, a set of the switches S1 and S3 and a set of the switches S2 and S4 are complementarily turned on and off. That is, the switches S2 and S4 are turned off when the switches S1 and S3 are ON, the switches S1 and S3 are turned off when the switches S2 and S4 are ON, and this operation is periodically repeated.

Furthermore, in a period where the switches S1 and S3 are ON, a current from the constant current circuit CS1 is supplied to an input side of the capacitor C1, and the output side of this capacitor is set to a ground potential. As a result, the capacitor C1 is charged to a voltage VCC. On the other hand, in a period where the switches S2 and S4 are ON, the current of the constant current circuit CS2 is drawn from an input side thereof, and a voltage of this circuit is lowered to the ground potential. The output side of the capacitor is connected to the output end, but disconnected from the ground. Thus, the charging state itself of the capacitor C1 is maintained, the voltage of the capacitor C1 on the output side becomes −VCC, and the voltage of the output end also becomes −VCC.

The voltage is held by the capacitor C2, and the voltage −VCC in the output end is maintained.

As described above, in this embodiment, charging and discharging with respect to the capacitor C1 are carried out by using the current from the constant current source. Therefore, a current quantity of this charging/discharging current can be restricted, and generation of noise in the power supply and the ground can be suppressed.

It is to be noted that although an example in which the charge pump generates −VCC is described to illustrate the present embodiment, the same advantages can be obtained by using the constant current source in a charge pump in which a low-potential side of a charged capacitor is connected to a high-voltage power supply to perform boosting.

Figure 2:
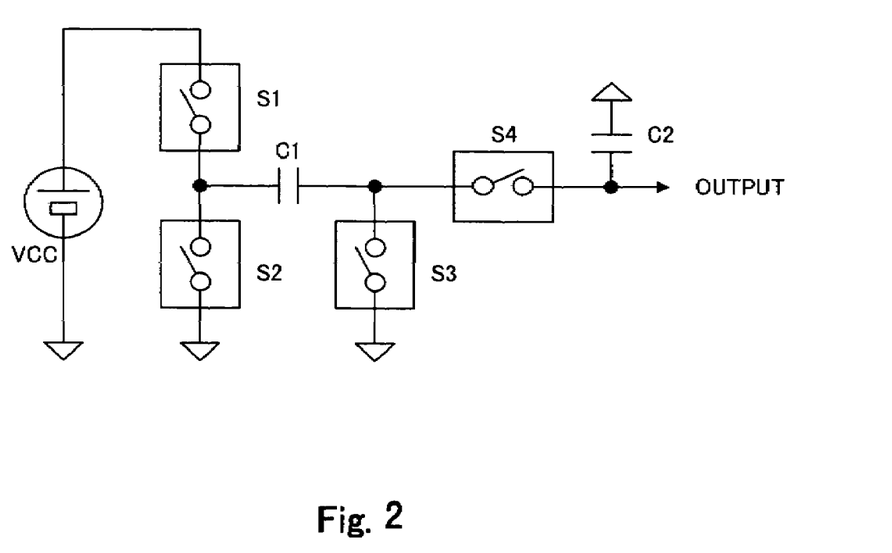
FIG. 2 is a view showing a configuration of a charge pump circuit according to another structural example.

FIG. 2 shows a configuration in which the constant current circuits CS1 and CS2 are eliminated, the switch S1 is directly connected to the power supply VCC and the switch S2 is directly connected to the ground in the configuration depicted in FIG. 1. In this configuration, although noise is increased, it is possible to obtain as a result of shifting a power supply voltage an output as generated by the configuration shown in FIG. 1.

"Video Signal Processing Circuit"

Figure 3:
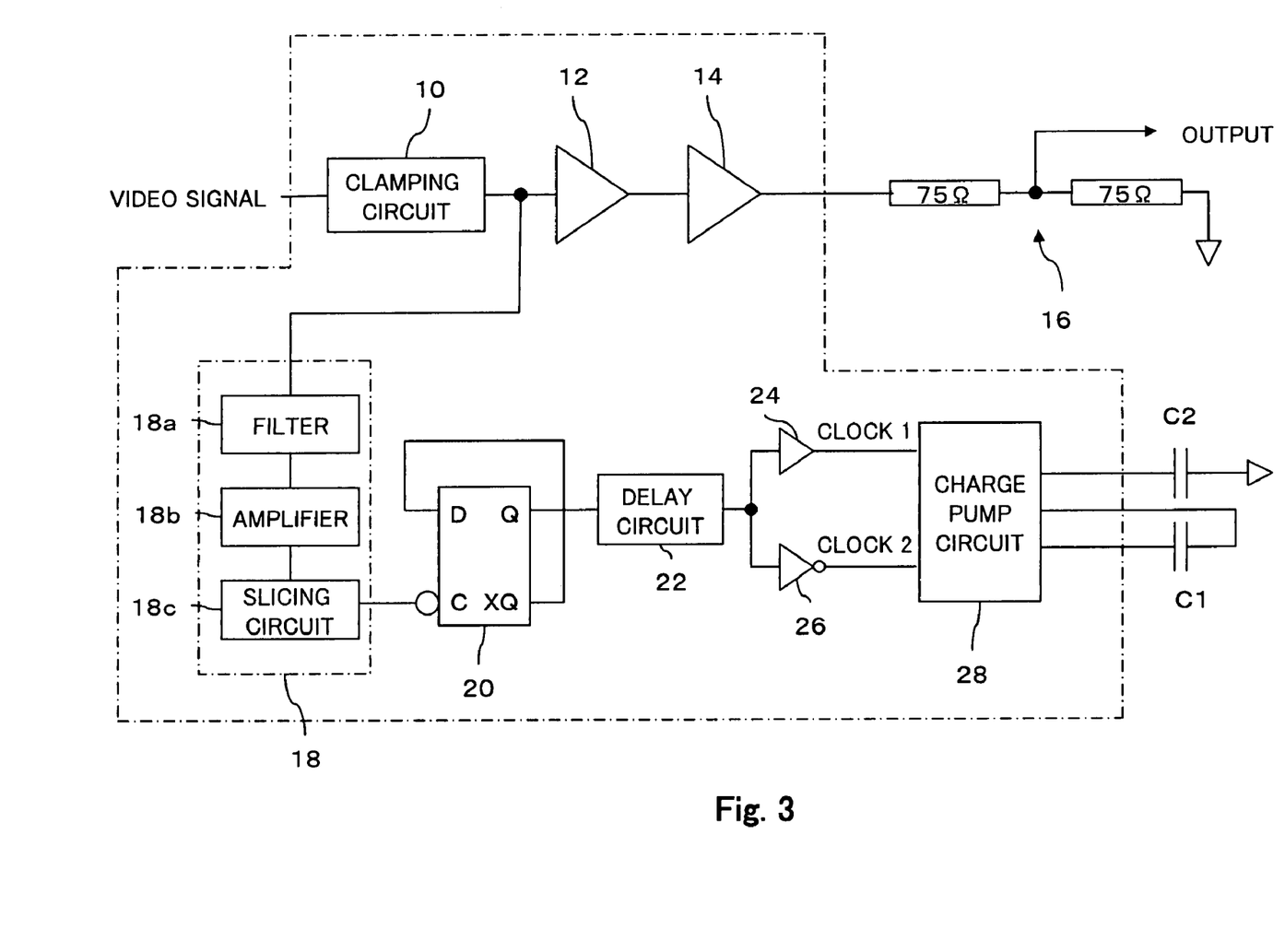
FIG. 3 is a view showing a configuration of a video signal processing apparatus.

FIG. 3 shows a video signal processing circuit. A video signal is input to a clamping circuit 10. This clamping circuit 10 clamps a direct-current level which is a reference in the video signal. As this reference level, a pedestal level or a sync chip level indicative of a fixed direct-current level is adopted. The video signal is a signal such as that shown in (a) of FIG. 4, a low-level horizontal synchronizing signal is arranged at the beginning of one horizontal period, and a color burst signal is arranged in a part of a subsequent front porch, and a luminance signal on which a color signal is superposed is positioned after the color burst signal.

An output from the clamping circuit 10 is subjected to predetermined amplification in a pre-amplifier 12, and then amplified to a predetermined level in a main amplifier 14. Further, the thus obtained video signal is output through a 75-Ω coaxial feeder 16. It is to be noted that transmission of the signal through the coaxial feeder 16 corresponds to outputting an input signal from an intermediate point between two 75-Ω resistances as shown in the drawing. Furthermore, in FIG. 3, a part surrounded by an alternate long and short dash line is formed into a single semiconductor integrated circuit.

Moreover, the output from the clamping circuit 10 is input to a synchronizing separation circuit 18. In this example, the synchronizing separation circuit 18 comprises a filter 18a, an amplifier 18b and a slicing circuit 18c.

The filter 18a removes a color signal component (a chroma component) from the video signal by removing a high-frequency component. The amplifier 18b amplifies the video signal from which the chroma component has been removed, thereby increasing an amplitude. The slicing circuit 18c slices the amplified video signal with a threshold value of a predetermined level so that a low-level synchronizing signal is separated.

Figure 4:
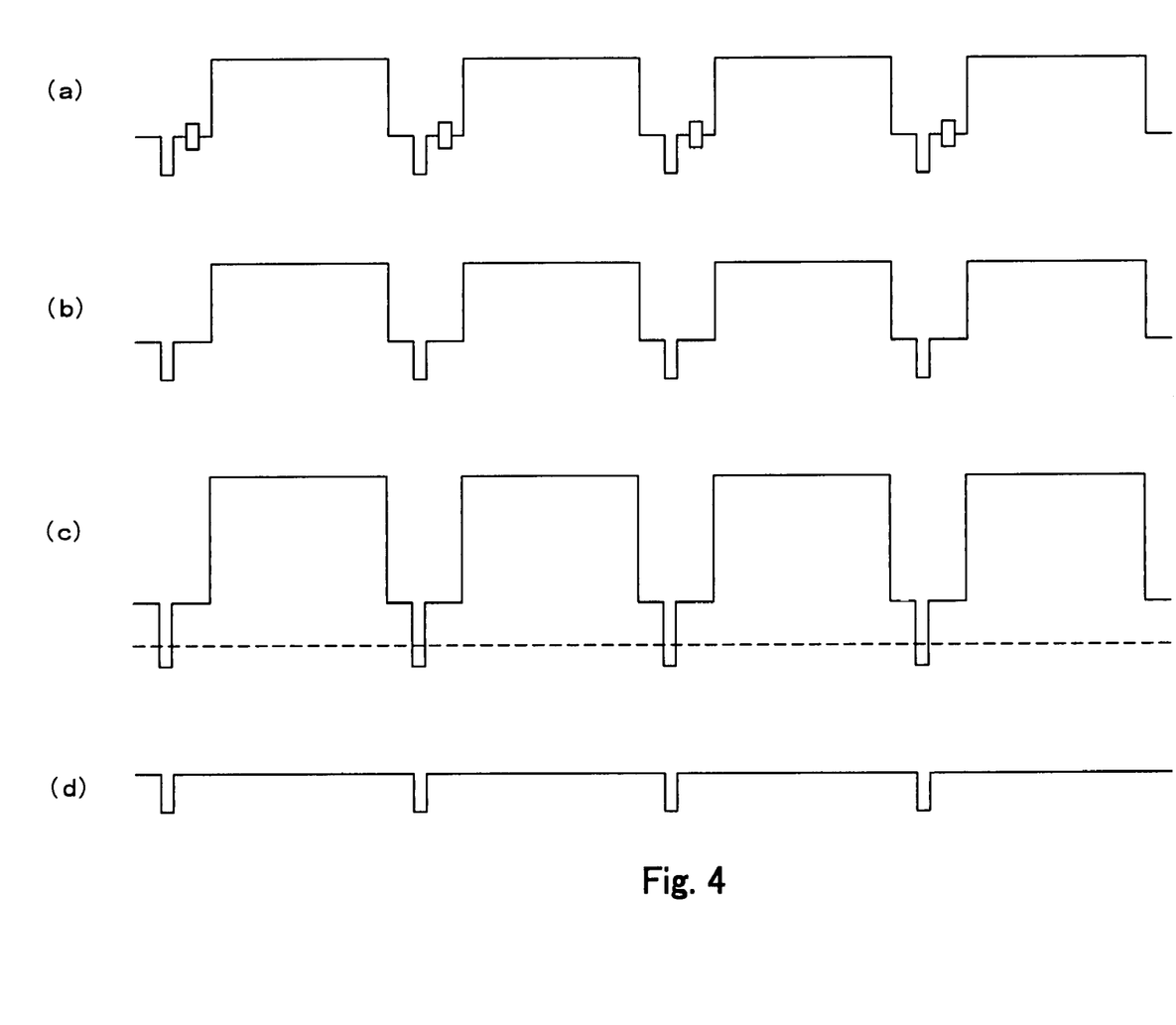
FIG. 4 is a view showing waveforms of respective portions in a synchronizing separation circuit.

That is, there is provided a video signal (an input waveform: luminance is fixed and a color signal is removed) as shown in (a) of FIG. 4. It is to be noted that a signal positioned at the porch before rising of the luminance signal is the color burst signal. When a chroma signal is removed from such an input waveform by the filter 18a, a high-frequency chroma signal is removed as shown in (b) of FIG. 4. When an output from this filter 18a is amplified by the amplifier 18b, a signal having an increased amplitude as shown in (c) of FIG. 4 can be obtained. Furthermore, performing slicing with such a threshold value as indicated by a broken line in (c) of FIG. 4 in the slicing circuit 18c separates a synchronizing signal shown in (d) of FIG. 4. It is to be noted that the chroma signal is removed, amplification is performed and then slicing is carried out in order to remove noise and avoid erroneous detection.

The synchronizing signal separated by the synchronizing separation circuit 18 in this manner is reversed and input to a clock end C of a flip-flop 20. An output from a reversal output end XQ of the flip-flop 20 is input to a data input end D, and the flip-flop 20 subjects a clock input to the clock input end C to ½ frequency division and outputs from a Q output end a result as a clock signal whose cycle is two times that of the synchronizing signal. (a) and (b) of FIG. 5 show the synchronizing signal and the clock signal subjected to ½ frequency division which is an output from the flip-flop 20.

Figure 5:
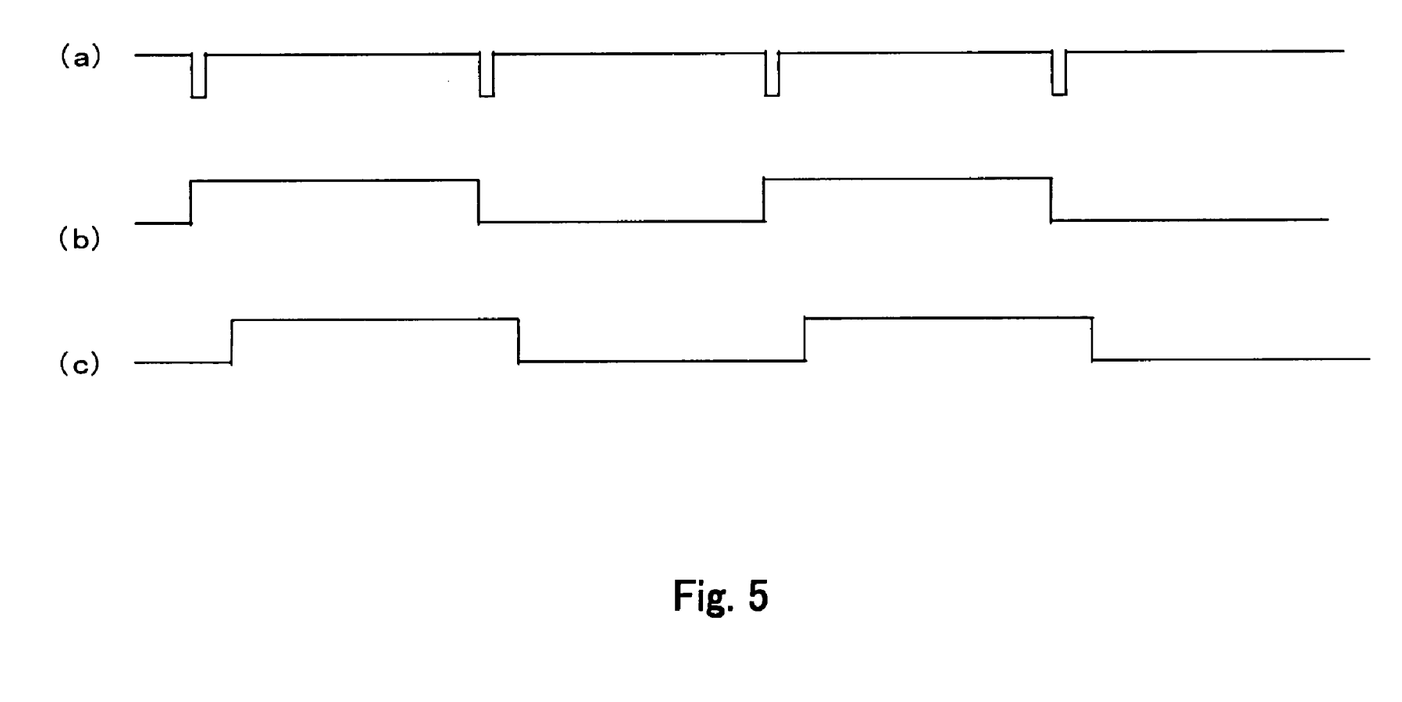
FIG. 5 is a view showing waveforms of a synchronizing signal and a clock signal.

The clock signal output from the flip-flop 20 is delayed by a predetermined quantity in a delay circuit 22 ((c) of FIG. 5), and then output as a clock 1 through a buffer 24 and as a clock 2 through an inverter 26. It is to be noted that the delay circuit 22 can be readily constituted by utilizing an operation delay or the like of a device as more inverters are connected.

These clocks 1 and 2 are used as complementary clock signals which control switching of the above-described switches S1 to S4.

Here, when actually turning on or off the switches S1 to S4, an ON period of each of the clocks 1 and 2 are set slightly smaller than an OFF period of the same (a duty ratio of these signals is set small) in order to assure generation of a period in which both the switches S1 and S3 are ON. This can be achieved by using any circuit suitable for delaying the rise of the clock signals 1 and 2, but allowing the fall of the clock signals 1 and 2 to remain unchanged.

Figure 6:
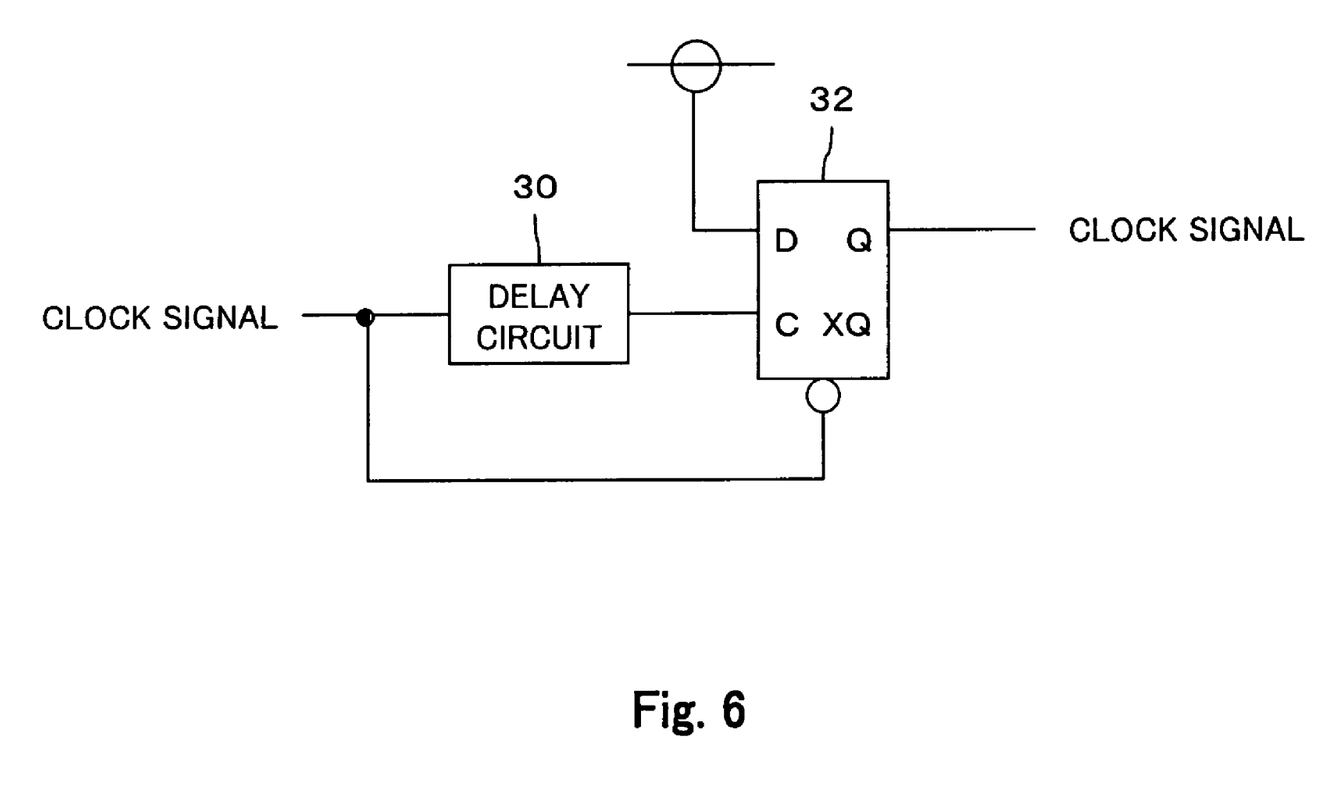
FIG. 6 is a view showing a configuration which reduces an ON period of the clock signal.

For example, as shown in FIG. 6, one flip-flop 32 in which a D input terminal is raised to an H level is provided, and a clock signal delayed by a delay circuit 30 is input to a clock input terminal of this flip-flop. On the other hand, a clock signal is reversed and input to a reset terminal of this flip-flop 32. As a result, the flip-flop 32 is set to the H level at a rising edge of the delayed clock signal, and reset at a falling edge of the non-delayed signal. Thereby, a clock signal having a shortened H-level period can be obtained.

The ON period of the clocks 1 and 2 can be shortened by utilizing such a circuit. It is to be noted that such processing can be implemented by a variety of circuit configurations.

The thus-obtained clocks 1 and 2 are supplied to the charge pump circuit 28 as complementary signals which control the switches of this circuit.

Figure 7:
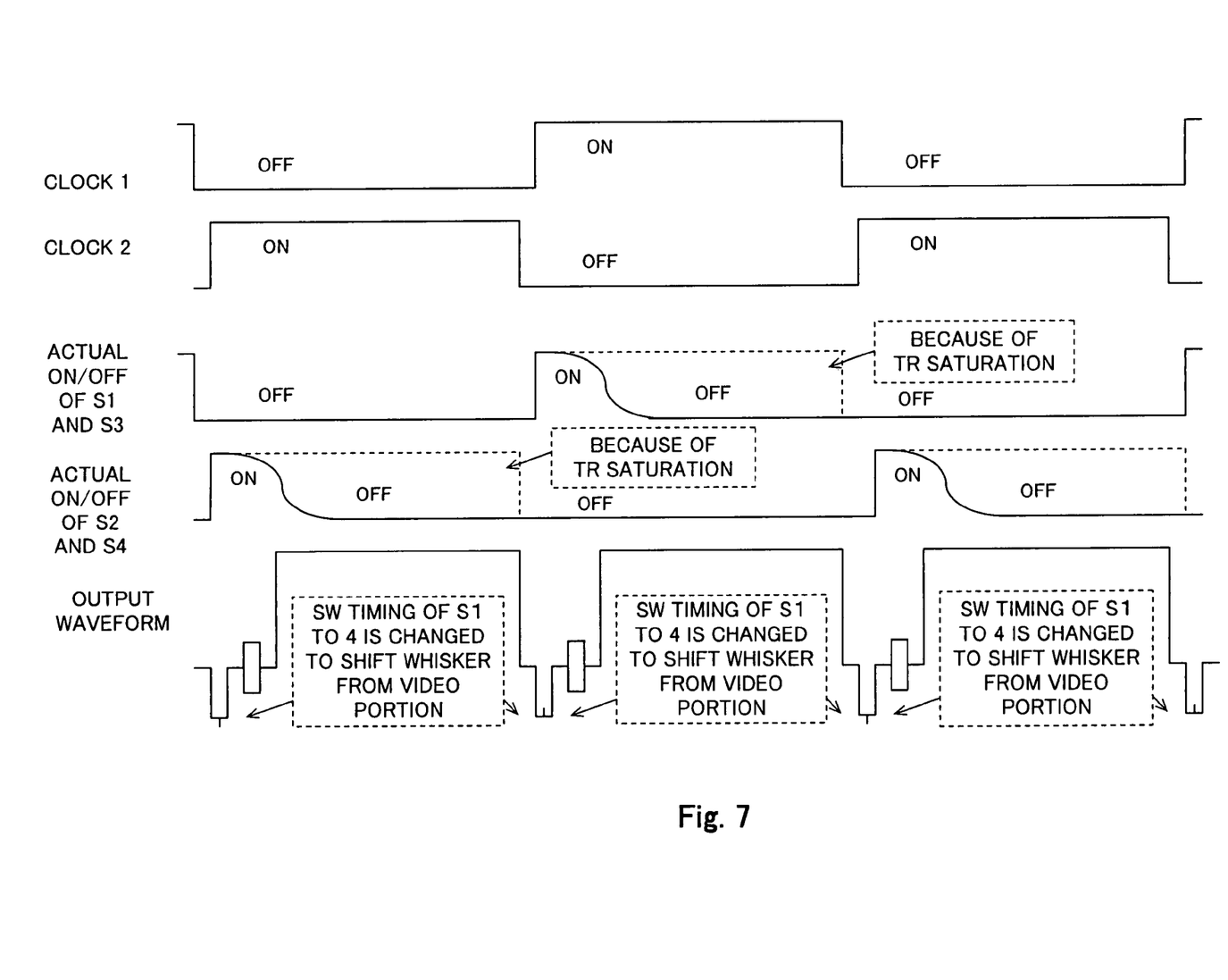
FIG. 7 is a view showing waveforms of respective portions in the charge pump.

FIG. 7 shows waveforms of various portions when the charge pump circuit is controlled by utilizing these clocks 1 and 2.

The switches S1 and S3 are turned on and off by the clock 1, and the switches S2 and S4 are turned on and off by the clock 2. As a result, the switches S2 and S4 are turned off in a period where the switches S1 and S3 are ON, and the switches S2 and S4 are turned on in a period where the switches S1 and S3 are OFF. Further, a period in which all the switches are OFF is inserted at each changeover timing.

Although the switches S1 and S3 are turned on in an H-level period of this clock 1 and the switches S2 and S4 are turned on in the H-level period of the clock 2, in reality, these switches S1 to S4 are turned on and, after a while, voltages on both sides of the switches S1 to S4 (the switches S1 and S3 or the switches S2 and S4) become substantially the same voltages, and transistors constituting the switches S1 to S4 are saturated to enter the OFF state. Therefore, a large current flows by on/off switching of the switches S1 to S4 only when the switches S1 to S4 are turned on.

Furthermore, when the switches S1 to S4 are turned on and a large current flows, noise is generated in the power supply voltage VCC. That is, when the switch S1 is turned on, an input-side voltage of the capacitor C1 is changed considerably from the ground potential to the VCC potential, and a large current flows toward the capacitor C1 from the power supply. Therefore, noise (a whisker in a negative direction) induced by this large current is generated in the power supply voltage VCC. On the other hand, when the switch S3 is turned on, the input-side voltage of the capacitor C1 is greatly changed from the power supply potential VCC to the ground potential, and a large current flows toward the ground from the capacitor C1. Therefore, noise (a whisker in a positive direction) induced by the large current is generated in the ground voltage.

When the noise is superposed on such a power supply voltage, circuits driven by this power supply are affected. For example, in the amplifiers 12 and 14 shown in FIG. 3, the noise is added to an output video signal, and a vertical stripe appears in images display using this video signal.

In this embodiment, however, a horizontal synchronizing signal is used for changeover of the switches in the charge pump circuit as described above, and ON timings of the switches S1 to S4 are shifted away from the portions of the video signal which are displayed on the screen. Therefore, even if noise is included in the video signal, the display is not affected.

In FIG. 7, although the ON timing of each of the switches S1 to S4 is set to the part of the horizontal synchronizing signal, the timing is not restricted in this manner, and when preferable the ON timing may be set to a porch portion or the like following the horizontal synchronizing signal (horizontal blanking period). This can be accomplished by setting a delay quantity of the above-described delay circuit 30.

Further, with the present invention, even if noise is superposed on a color burst signal, there is almost no problem, and hence the ON timing of each of the switches S1 to s4 may be set in a period of this color burst signal. Furthermore, because actual display is not usually carried out in a video part during the first several horizontal scan periods, the ON timing of each of the switches S1 to S4 may be set in these periods.

Figure 8:
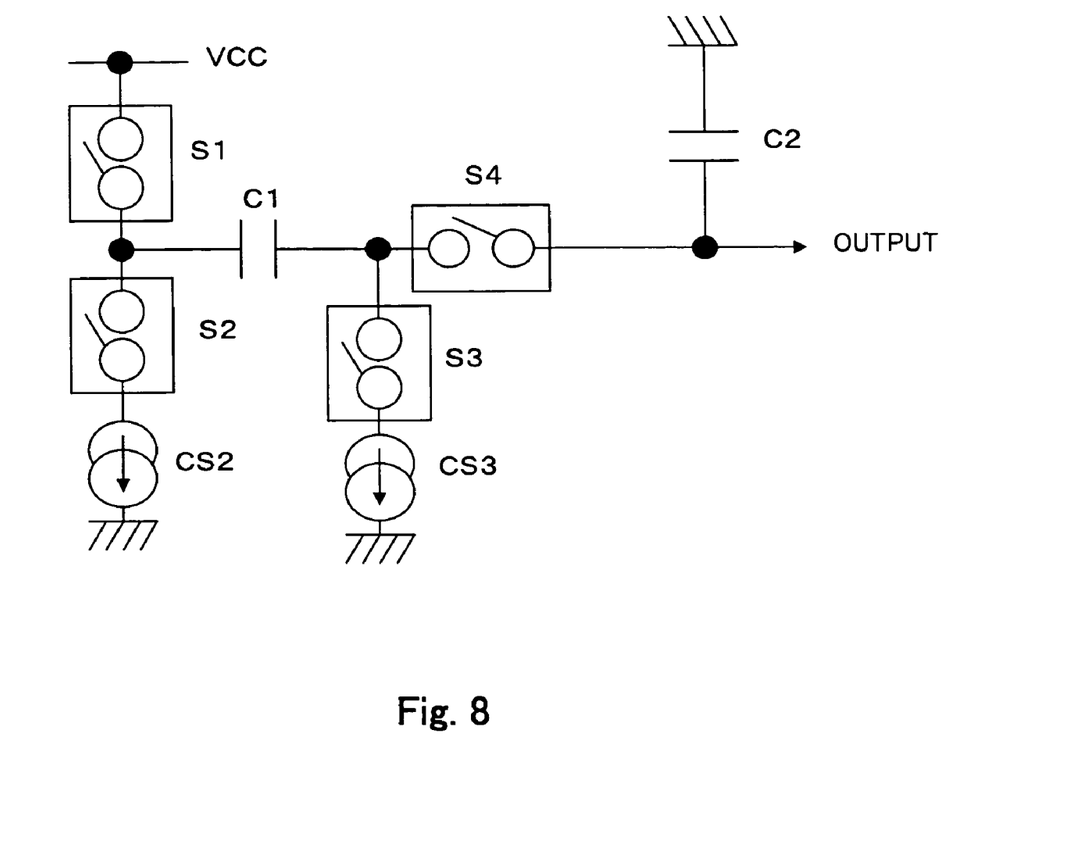
FIG. 8 is a view showing a configuration of a charge pump circuit according to another embodiment of the present invention.
Figure 9:
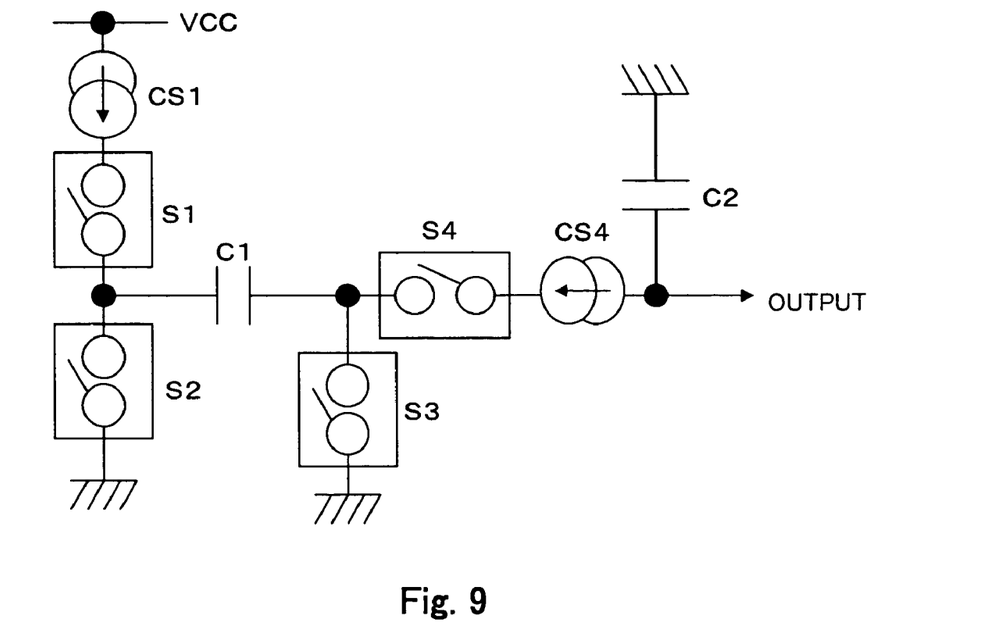
FIG. 9 is a view showing a configuration of a charge pump circuit according to still another embodiment of the present invention.
Figure 10:
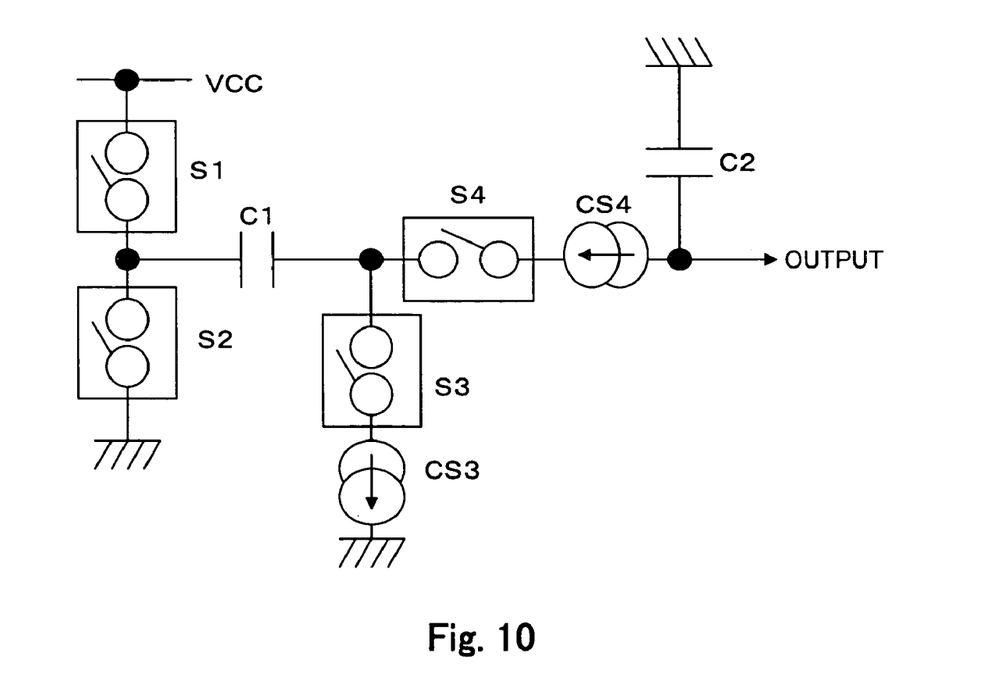
FIG. 10 is a view showing a configuration of a charge pump circuit according to yet another embodiment of the present invention.

FIGS. 8 to 10 show structural examples in which an insertion position of the constant current circuit is changed. In FIG. 8, the constant current circuit CS1 in FIG. 1 is eliminated, and a constant current circuit CS3 is provided between a switch S3 and a ground. As a result, when switches S1 and S3 are turned on, a charging current of a capacitor C1 becomes a constant current which is determined by the constant current circuit CS3, thereby obtaining the same effects and advantages as those provided by the configuration of FIG. 1.

In the further embodiment illustrated in FIG. 9, the constant current circuit CS2 in FIG. 1 is eliminated, and a constant current circuit CS4 is provided between a switch S4 and an output end. As a result, when switches S2 and S4 are turned on, a discharging current of a capacitor C1 becomes a constant current which is determined by the constant current circuit CS4, thereby obtaining the same effects and advantages as obtained by the configuration shown in FIG. 1.

In the still further embodiment illustrated in FIG. 10, the constant current circuits CS1 and CS2 in FIG. 1 are eliminated, a constant current circuit CS3 is provided between a switch S3 and a ground, and a constant current circuit CS4 is provided between a switch S4 and an output end. As a result, a charging current of a capacitor C1 becomes a constant current which is determined by the constant current circuit CS3 when switches S1 and S3 are turned on, and a discharging current of the capacitor C1 becomes a constant current which is determined by the constant current circuit CS4 when switches S2 and S4 are turned on.

Figure 11:
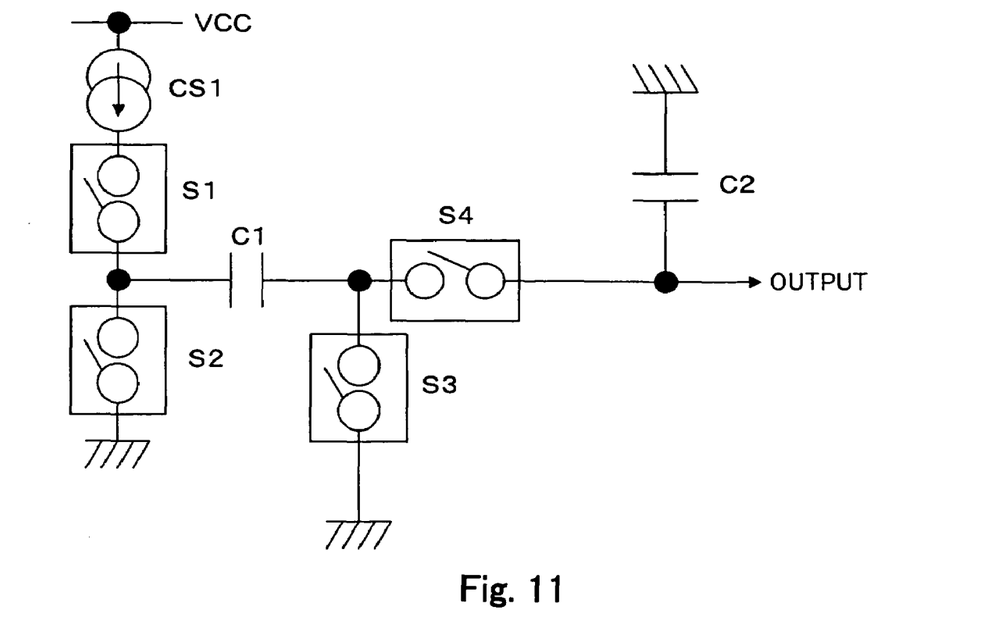
FIG. 11 is a view showing a configuration of a charge pump circuit according to a further embodiment of the present invention.
Figure 12:
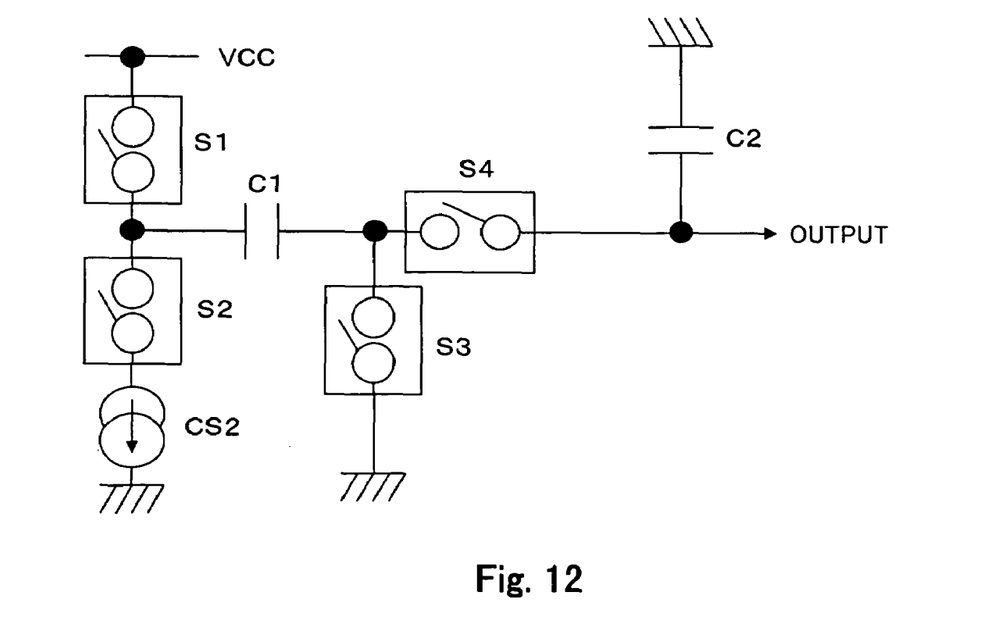
FIG. 12 is a view showing a configuration of a charge pump circuit according to a still further embodiment of the present invention.

FIGS. 11 and 12 show structural examples of additional embodiments of the present invention, in which either a constant current circuit CS1 or a constant current circuit CS2 is eliminated. That is, the constant current circuit CS2 is eliminated in the structural example of FIG. 11, and the constant current circuit CS1 is eliminated in the structural example of FIG. 12. As a result of these modifications, one of a charging current and a discharging current of a capacitor C1 becomes a constant current, and occurrence of noise in either charging or discharging can thereby be prevented.

What is claimed is:

1. A charge pump circuit, comprising:
   a synchronizing separation circuit that separates a synchronizing signal from a composite signal including a video signal and the synchronizing signal,
   wherein the synchronizing separation circuit comprises a filter to remove a high-frequency component from the composite signal and a slicing circuit that slices the filtered composite signal with a threshold value of a predetermined level, thereby separating the synchronizing signal from the composite signal; and
   a flip-flop that divides a frequency of the synchronizing signal acquired by the synchronizing separation circuit, thereby obtaining a clock,
   wherein the clock from the flip-flop is utilized to control a direction of applying a power supply voltage to a capacitor so that charging of the power supply voltage to the capacitor and shifting of the power supply voltage charged in the capacitor are carried out, thereby obtaining a shifted output voltage.

2. The charge pump circuit according to claim 1, wherein an output from the flip-flop is delayed by a predetermined quantity, and the charging and shifting of the power voltage to the capacitor are changed over after a period of a horizontal blanking period of the video signal and in a period where the video signal to be displayed in a display device does not exist.

3. The charge pump circuit according to claim 1, wherein an output from the flip-flop is delayed by a predetermined quantity, and the charging and shifting of the power voltage to the capacitor are changed over after a period of a horizontal blanking period of the video signal and in a period where the video signal to be displayed in a display device does not exist and in a period where a burst signal does not exist.

4. The charge pump circuit according to claim 1, wherein a constant current from a constant current source is used for charging or discharging the capacitor.

5. A charge pump circuit, comprising:
   a first switch for selecting one of a high-voltage power supply and a low-voltage power supply;
   a capacitor having one end connected to the first switch to be charged and discharged; and a second switch for selectively connecting another end of the capacitor to one of the low-voltage power supply and an output end, wherein the other end of the capacitor is connected to the low-voltage power supply by the second switch when the first switch selects the high-voltage power supply, and the other end of the capacitor is connected to the output end by the second switch when the first switch selects the low-voltage power supply, thereby obtaining at the output end an output voltage lower than the low-voltage power supply by a voltage corresponding to the high-voltage power supply, and an output obtained by subjecting a synchronizing signal separated from a video signal by a synchronizing separation circuit to frequency division by a flip-flop is utilized as a clock signal that controls switching of the first and second switches, wherein the synchronizing separation circuit comprises a filter to remove a high-frequency component from the composite signal and a slicing circuit that slices the filtered composite signal with a threshold value of a predetermined level, thereby separating the synchronizing signal from the composite signal.

6. The charge pump circuit according to claim 5, wherein the low-voltage power supply is a ground, and obtains a negative power source voltage as an output voltage.

7. The charge pump circuit according to claim 5, wherein an output from the flip-flop is delayed by a predetermined quantity, and the first and second switches are changed over after a period of a horizontal blanking period of the video signal and in a period where the video signal to be displayed in a display device does not exist.

8. The charge pump circuit according to claim 5, wherein an output from the flip-flop is delayed by a predetermined quantity, and the first and second switches are changed over after a period of a horizontal blanking period of the video signal and in a period where the video signal to be displayed in a display device does not exist and in a period where a burst signal does not exist.

9. The charge pump circuit according to claim 5, wherein a constant current from a constant current source is used for charging or discharging the capacitor.

* * * * *